United States Patent [19]

Willette

[11] 4,319,075

[45] Mar. 9, 1982

[54] SEALED ROUTING OF UNDERCARPET CABLE

[75] Inventor: Albert D. Willette, Pfafftown, N.C.

[73] Assignee: AMP Inc., Harrisburg, Pa.

[21] Appl. No.: 228,644

[22] Filed: Jan. 26, 1981

[51] Int. Cl.³ .................. H01R 43/00; H02G 3/26
[52] U.S. Cl. .................. 174/117 FF; 29/868; 174/71 R
[58] Field of Search .......... 174/117 FF, 117 A, 70 R, 174/70 C, 71 R, 72 C, 117 F; 29/868, 872

[56] References Cited

U.S. PATENT DOCUMENTS 3,524,921  8/1970  Wolf ..................... 174/117 A
4,219,928  9/1980  Kuo ..................... 174/117 FF X

OTHER PUBLICATIONS

"Under Carpet Power System" dated Dec. 27, 1979.

Primary Examiner—Roy N. Envall, Jr.
Attorney, Agent, or Firm—Gerald K. Kita

[57] ABSTRACT

The present invention relates to utilization of a flat conductor cable enclosed within a sealed envelope. In particular, methods are disclosed for entering the envelope to route the cable along an angle turn or to splice the cable to another, like cable.

4 Claims, 10 Drawing Figures

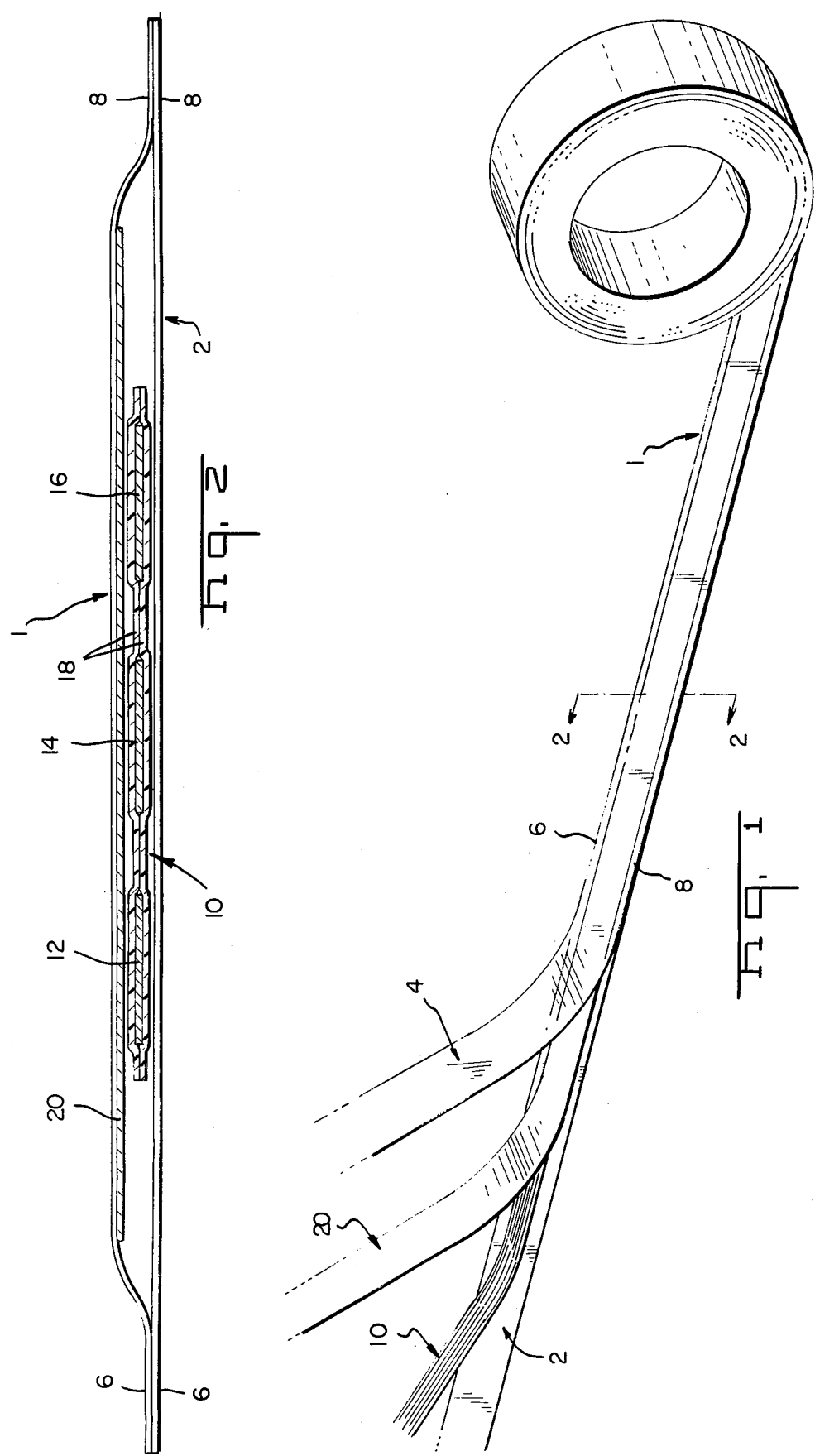

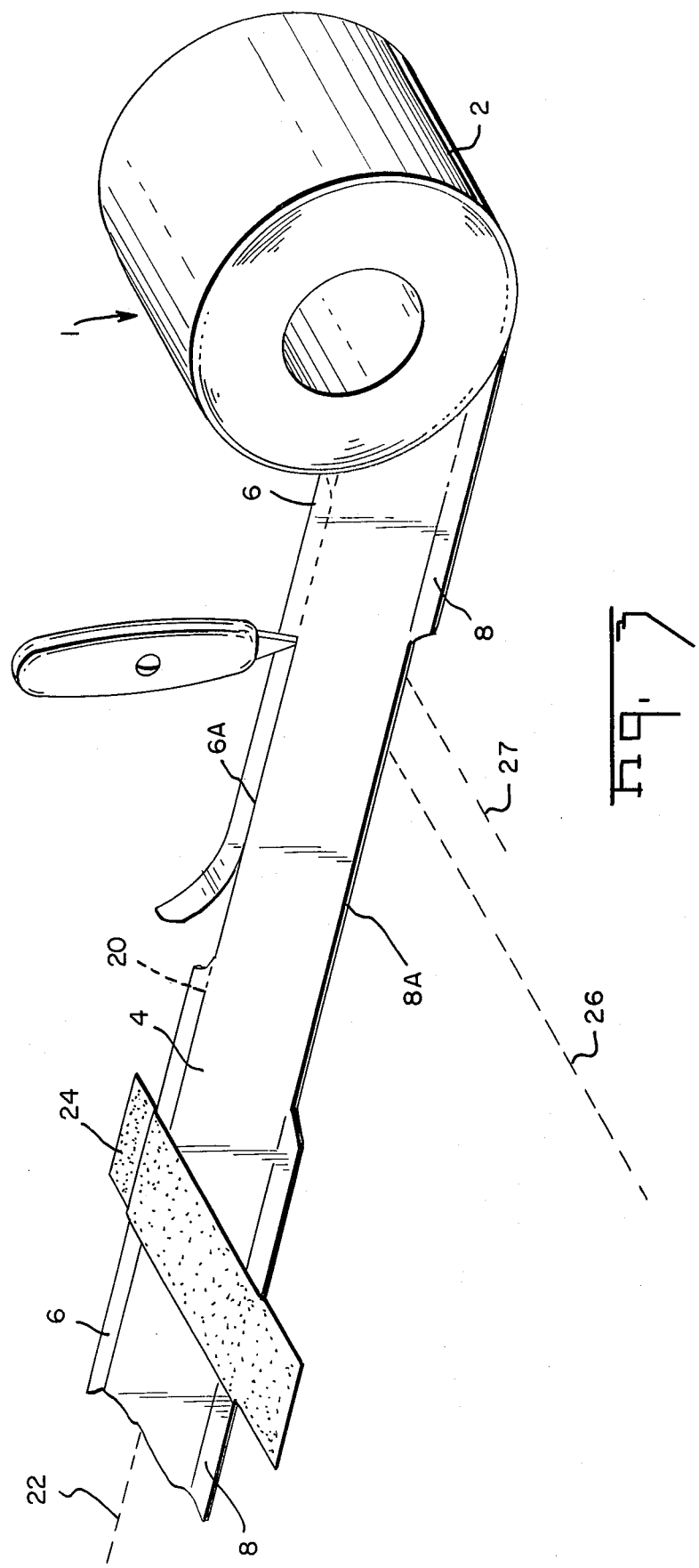

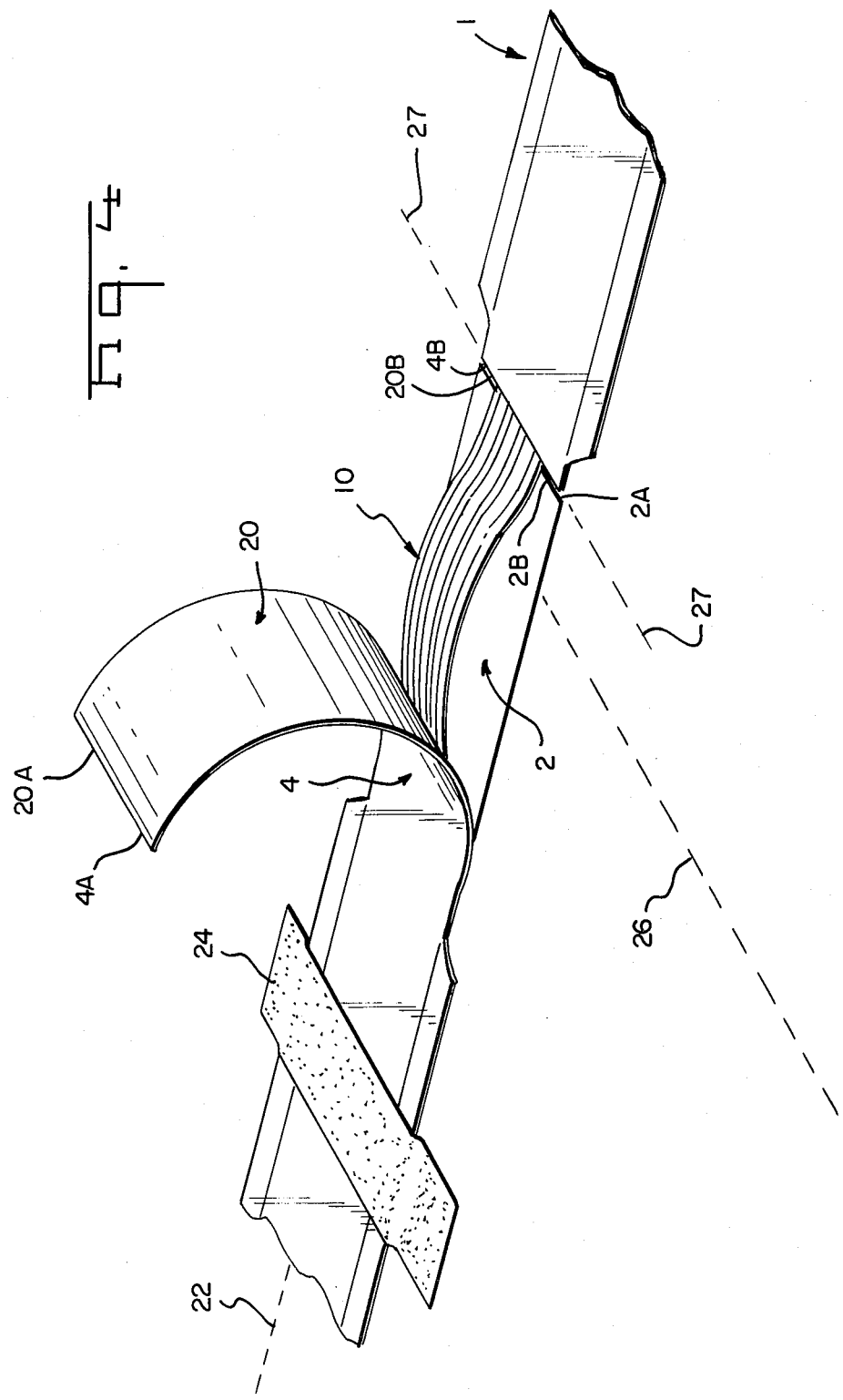

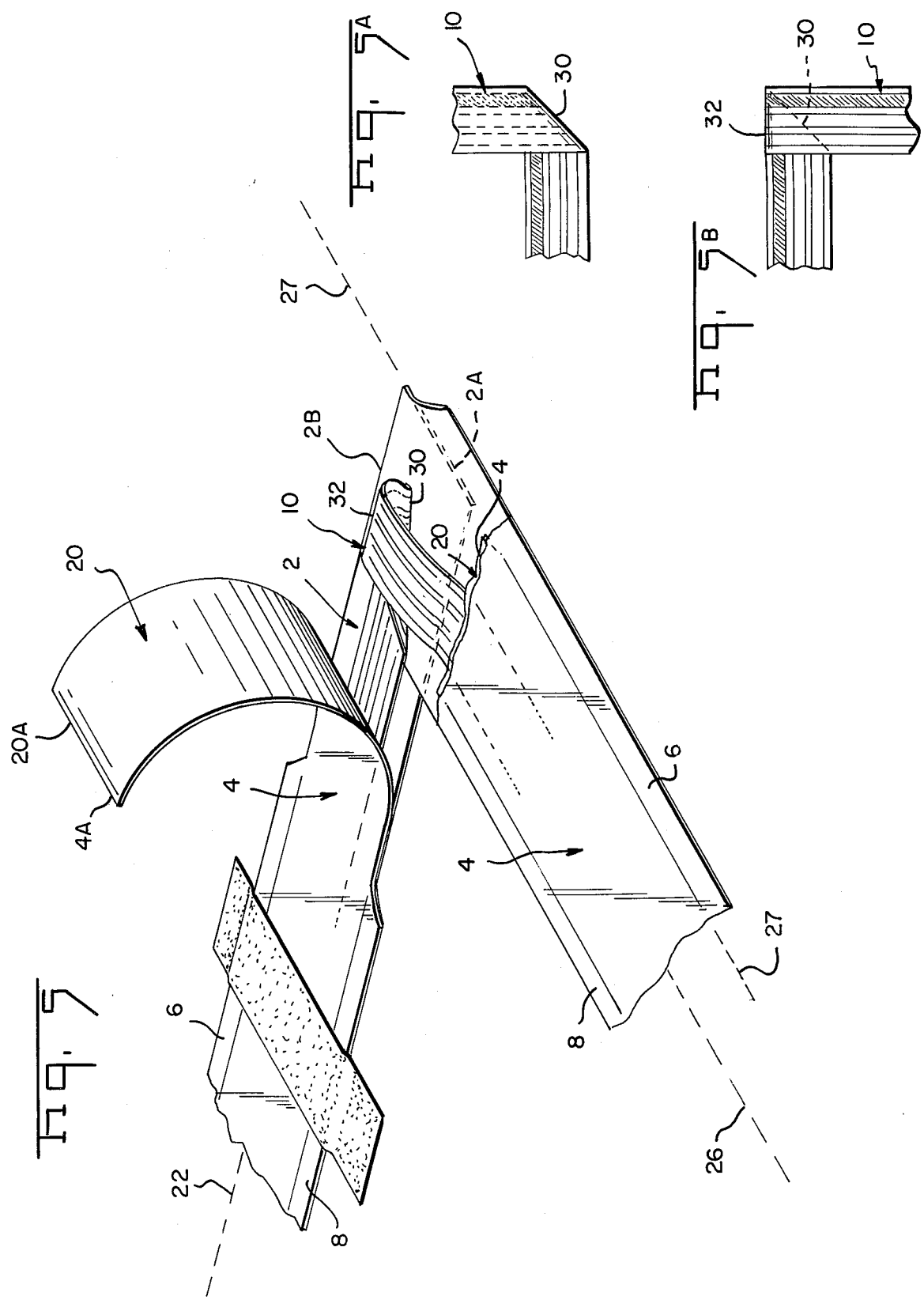

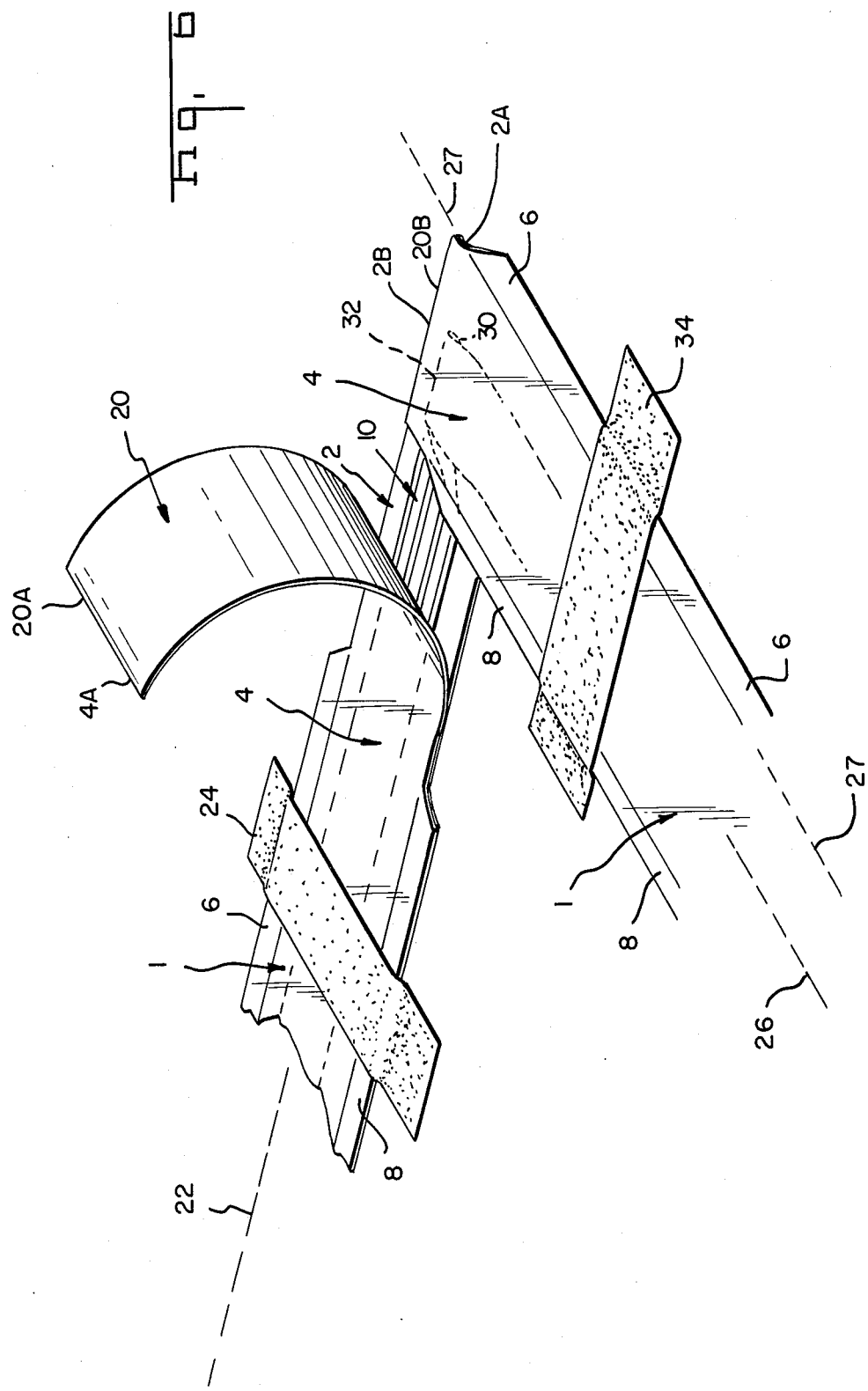

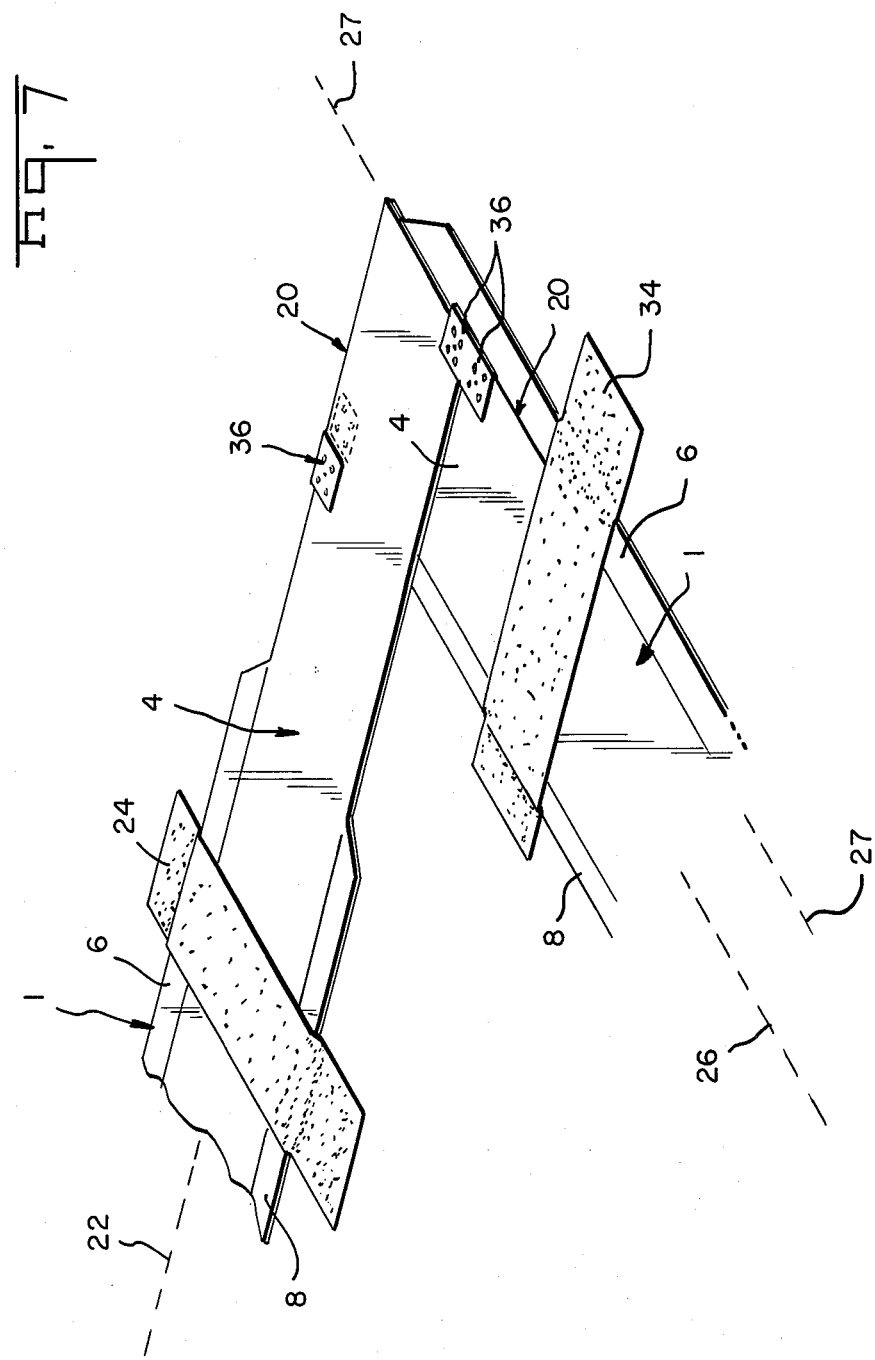

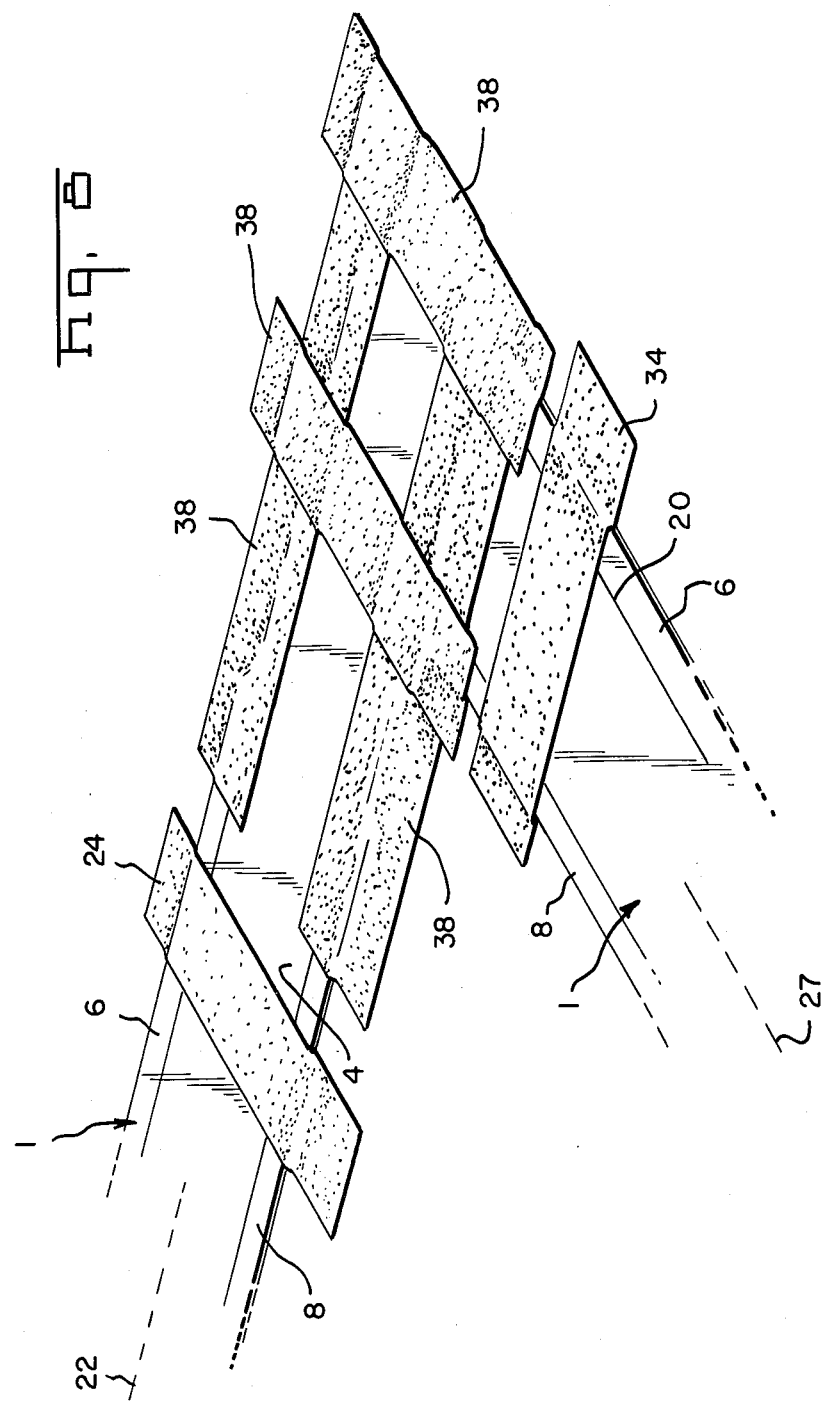

SEALED ROUTING OF UNDERCARPET CABLE

FIELD OF THE INVENTION

The present invention relates to utilization of a flat conductor cable enclosed within a sealed envelope. In particular, methods are disclosed for entering the envelope to route the cable along an angle turn or to splice the cable to another, like cable.

BACKGROUND OF THE INVENTION

A commercial office is supplied with circuit wiring by a network of flat electrical cable routed over the office floor and covered by floor covering in the form of carpet squares. The cable requires a bottom shield layer of thin plastic, intended to protect the cable from damage by irregularities of the floor surface. The cable itself comprises three flexible, flat copper conductors within a common flexible, flat plastic sheath. The cable is covered by a ribbon layer of cold rolled steel which protects the cable from foot traffic and furniture movement and placement. The layers are taped to the floor. The carpet squares are glued to the floor and over the metal shield.

In an improved undercarpet wiring installation, the cable and the metal shield are enclosed within a sealed, plastic film envelope which protects the cable from contaminate fluids and fluid borne residues. The envelope must be opened to gain access to the cable conductors. The present invention relates to a procedure for reclosing and sealing any openings made in the envelope pursuant to making various types of electrical connections to the cable conductors. Further the invention relates to a procedure for making angle turns along the route of the cable, without a need for cutting the conductors, but insuring that openings in the envelope are reclosed and sealed.

SUMMARY OF THE INVENTION

The present invention resides in the structure of, and the method for making, an angle turn in the route of a flat cable protected by a metal shield layer and an enclosing sealed envelope. Further the invention resides in a method for providing an angle turn in the route of undercarpet, envelope enclosed, flat cable without a need for cutting the cable conductors. According to the present invention, any openings in the envelope are reclosed and sealed. The invention resides further in the structure of, and method of assembling, an electrical interconnection of two flat cables contained within a reclosed and resealed envelope.

The cable to which the present invention pertains has an outer envelope sealed along its side margins. These side margins may be cut away taking care not to cut entirely across the envelope. Thereby the envelope is opened along the side margins to allow various layers of the cable to be lifted apart temporarily from one another.

An angle turn maybe made in the route of a cable across a floor. First, the side margins are cut away carefully as before explained. Thereafter, the shield and envelope layers are carefully severed, without severing the cable. The cable is then folded diagonally a first time, to project the cable run in a direction opposite to the desired direction of the turn. Then the cable is folded again to project the cable run in the desired direction. The first fold disposes the cable layers upside down. The second fold reorients the cable layers in a correct, stacked relationship. Then the shield and envelope layers are interleaved and relaid to cover the bottom and top of the doubly folded cable. Tape is applied to the open edges of the envelope layers, sealing the edges and securing the cable to the floor.

An object of the present invention is to provide a structure of, and a method for making, an angle turn in a run of flat cable enclosed in a sealed envelope.

Another object is to provide a method for closing and resealing openings in an envelope which sealably encloses a flat cable.

Another object is to provide a structure of, and method for making, a tap connection or an angle turn in undercarpet cable enclosed in a sealed envelope.

Other objects and advantages of the present invention will become apparent from the following detailed description taken in conjunction with the drawings.

DESCRIPTION OF THE DRAWINGS

FIG. 1 is a perspective view of an undercarpet flat cable for circuit wiring, with the various layers of the cable separated for illustration purposes.

FIG. 2 is an enlarged cross section of the cable shown in FIG. 1, with the various layers of the cable separated for illustration purposes.

FIG. 3 is a diagrammatic perspective of a cable run, illustrating opening of a sealed envelope of the cable shown in FIG. 2.

FIGS. 4 and 5 are diagrammatic perspectives illustrating various stages during construction of an angle turn in the cable run of FIG. 4.

FIGS. 5, 5A and 5B are fragmentary plan views illustrating various stages in construction of an angle turn in the cable run as shown in FIG. 4.

FIGS. 6-8 are diagrammatic perspectives illustrating various stages in construction of an angle turn in the cable run shown in FIG. 4.

DETAILED DESCRIPTION

FIGS. 1 and 2 illustrate an undercarpet cable assembly 1 for use in circuit wiring. The assembly is made up of several layers. The cable itself, is generally illustrated at 10, and comprises a flexible sheath of insulation 18 bonded to and encasing three flat flexible conductors 12, 14 and 16, each of cross section equivalent to American Wire Guage (AWG) Number 12 copper wire, having a current carrying capacity of 20 amperes at 120 volts.

The cable 10 is overlaid with an elongated metal shield 20 comprising a flexible elongated ribbon layer of 10 mils thick, galvanized or electroplated zinc over cold rolled steel. The cable 10 and metal shield 20 are stacked together without bonding therebetween, and are encased by an elongated envelope comprising bottom and top layers 2, 4 of waterproof, flexible, nonconductive vinyl film ribbons, 10 mils thick. The side edge margins 6, 8 of the envelope layers 2, 4 overlap and are sealed together, either by adhesive or heat bonding. Layer 4 is bonded to shield 20. For the purposes of illustration, FIG. 2 shows the various layers of the cable assembly separated. In practice they are stacked flatly against each other to provide a low height assembly. The assembly may be rolled up for storage as shown in FIG. 1.

The metal shield 20 provides physical damage protection and provides an electrical ground plane, commoned electrically to an external ground circuit for the cable 10. The envelope seals the cable from contact with fluids and fluid borne contaminants.

This cable assembly 1 is desired particularly for solving a problem present in prior, undercarpet cable installations. In prior installations, all the various layers of the cable were separate, and had to be routed separately over one another. Each layer was anchored to the floor with adhesive backed tape. If a sealed envelope was desired, additional layers of tape were applied continuously over the side edges of the layers. The cable assembly 1 has preassembled layers and saves installation time and materials.

FIG. 3 illustrates a cable assembly 1 routed along a floor. The route is marked by a chalk line 22 which is covered by the cable centerline. Lengths of tape 24 are applied at intervals along the cable assembly 1 to tape the same to the floor. Suppose the route is to have an angle turn to run along another chalk line 26. Where the cable assembly 1 crosses the chalk line 26, a razor knife 28 is used to sever through and cut away sections of the edge margins 6 and 8 of the layers 2 and 4, providing openings in the sealed margins along a limited length of the sealed envelope. The edges 6A and 8A of the openings are against the side edges of the shield 20.

FIG. 4 illustrates the next series of steps, namely providing a transverse cut through only the layers 2, 4 and 20, along an imaginary line 27, parallel to the chalk line 26 where the side edge of shield 20 is expected to be laid, leaving the cable 10 continuous with the remainder of the cable assembly 1.

FIGS. 5, 5A and 5B illustrate a series of folds applied to the remainder of the cable assembly 1 to orient the cable assembly through the angle turn. The severed side margins 6 and 8 allow the transversely cut layers 2, 4 and 20 to be peeled back, exposing the cable 10. The exposed cable 10 is subjected to a first diagonal fold 30, applied and creased, which inverts the remainder of the cable assembly 1, and projects the same through a first angle turn in a direction opposite to that of the desired route, with the cable assembly centerline aligned with the chalk line 26. FIG. 5B illustrates a second, transverse fold 32, applied and creased, in the cable 10 and the layer 2. The fold 32 is aligned with that edge of the cable 10 on the outside of the angle turn. Thereby the cable assembly 1 is routed in the desired direction, and placed so that the centerline of the cable assembly is aligned along the chalk line 26. The cable 10 will have its folded sections overlying one another and stacked flatly against one another. The layer 2 will have end sections 2A and 2B defined by the transverse cut through layer 2 along chalk line 26. More importantly the sections 2A and 2B of layer 2 are interleaved and overlapped, and are stacked flatly underneath the cable 10, to provide a long leakage path covering the open transverse cut through the layer 2. The openings in the edge margins of the layer 2 are resealed with adhesive backed tape, as described hereinafter.

FIG. 6 shows the remainder of the cable assembly 1 secured by a length of tape 34 to the floor. The free end sections 20A, 20B of the transversely severed metal shield 20 are then interleaved and overlapped, and then stacked flatly over and against the cable 10. The side edge of shield section 20B is laid along line 27. FIG. 7 illustrates the interleaved, free end sections of the metal shield 20 joined together mechanically and electrically by flat plate electrical terminals 36, of a type disclosed in U.S. patent application, Ser. No. 43,966 filed May 30, 1979 and now U.S. Pat. 4,263,474. The metal shield 20 thereby becomes electrically continuous, and covers over the folded sections of cable 10. The terminals 36 penetrate not only shield 20 but also end sections 4A, 4B of the layer 4 which are bonded to shield 20 and become interleaved, overlapped and stacked flatly over and against the joined sections of sheath 20. FIG. 8 illustrates lengths of adhesive backed tape 38 applied over the open edge of the layers 2 and 4, resealing the edges and securing the assembly 1 to the floor.

Although one or more preferred embodiments are disclosed, other embodiments and modifications of the present invention are intended to be covered by the spirit and scope of the claims.

What is claimed is:

1. A method for making an angle turn in a run of flat cable enclosed in a sealed envelope, comprising the steps of:
   providing openings into sealed together side margins along a limited length of a sealed envelope which encloses an elongated flat electrical cable,
   severing across a bottom layer and a top layer of said envelope and across a metal shield layer contained by said envelope,
   constructing a first angle turn in said cable in a first direction directly opposite to the desired direction of cable turn,
   folding a first diagonal fold in said cable,
   constructing a second angle turn in said cable in said desired direction,
   folding a second fold in said cable,
   interleaving said metal shield layers,
   joining together said interleaved metal shield layers,
   interleaving said bottom layers of said envelope and said top layers of said envelope, and
   taping shut said openings in said side margins.

2. The method as recited in claim 1, and further including the step of: securing said taped shut side margins to a floor against which said cable is routed.

3. An angle turn in an assembly of a flat cable enclosed together with a metal shield layer in a sealed envelope, comprising:
   side margins of said envelope having openings therein,
   said envelope being transversely severed through defining free end sections,
   said metal shield being transversely severed through defining free end sections thereof,
   said cable having a first creased fold and a second creased fold defining stacked sections of said cable overlying one another,
   said free end sections of said metal shield being interleaved and joined together,
   said free end sections of said envelope being interleaved and covering said sections of said cable and said sections of said metal shield, and
   means sealing said openings in said side margins.

4. The structure as recited in claim 3, wherein, said means comprises adhesive tape covering and securing said side margins to a floor over which said cable assembly is routed.

* * * * *